(12) United States Patent
Herold et al.

(10) Patent No.: US 8,793,218 B2
(45) Date of Patent: Jul. 29, 2014

(54) METHOD AND APPARATUS FOR COPYING OBJECTS IN AN OBJECT-ORIENTED ENVIRONMENT USING A MULTIPLE-TRANSACTION TECHNIQUE

(75) Inventors: Steven D. Herold, Madison, AL (US); Valery Gerard, Madison, AL (US)

(73) Assignee: Intergraph Technologies Company, Las Vegas, NV (US)

( * ) Notice: Subject to any disclaimer, the term of this patent is extended or adjusted under 35 U.S.C. 154(b) by 394 days.

(21) Appl. No.: 12/476,399

(22) Filed: Jun. 2, 2009

(65) Prior Publication Data

US 2009/0300083 A1 Dec. 3, 2009

Related U.S. Application Data

(60) Provisional application No. 61/058,531, filed on Jun. 3, 2008.

(51) Int. Cl.
*G06F 17/30* (2006.01)

(52) U.S. Cl.
USPC .............................. 707/647; 707/649; 707/651

(58) Field of Classification Search
USPC ......... 707/644, 645, 600, 611, 647, 649, 650, 707/651, 653, 654, 668, 804, 808
See application file for complete search history.

(56) References Cited

U.S. PATENT DOCUMENTS

| | | | | |
|---|---|---|---|---|
| 5,692,184 A | * | 11/1997 | Ardoin et al. | 700/182 |
| 6,052,691 A | * | 4/2000 | Ardoin et al. | 1/1 |
| 6,292,804 B1 | * | 9/2001 | Ardoin et al. | 707/794 |
| 6,633,869 B1 | * | 10/2003 | Duparcmeur et al. | 1/1 |
| 6,772,168 B2 | * | 8/2004 | Ardoin et al. | 1/1 |
| 7,467,268 B2 | * | 12/2008 | Lindemann et al. | 711/162 |
| 7,917,534 B2 | * | 3/2011 | Demiroski et al. | 707/790 |
| 8,527,721 B2 | * | 9/2013 | Atluri et al. | 707/649 |
| 8,589,451 B1 | * | 11/2013 | Zahn et al. | 707/803 |

(Continued)

FOREIGN PATENT DOCUMENTS

EP 1 538 537 6/2005 ............. G06F 17/30

OTHER PUBLICATIONS

Batz et al. "A Data Model Supporting System Engineering," *Computer Software and Applications Conference, COMPSAC '88 Proceedings, Twelfth International*, pp. 178-185 (1988).

(Continued)

*Primary Examiner* — Marc Filipczyk
(74) *Attorney, Agent, or Firm* — Sunstein Kann Murphy & Timbers LLP

(57) ABSTRACT

A large number of objects, such as objects representing beams and columns in an object-oriented enterprise engineering system, may be copied in a model database by partitioning the objects according to certain criteria into a number of ordered small copy groups and copying the objects in each group as an atomic operation. Objects that are to be copied are organized into the ordered groups, and the groups are copied in order, such that all predecessors of a given object are copied into the database before, or in the same small operation as, the given object. If a large copy operation abnormally terminates before all the small copy operations have been completed, the model database is, nevertheless, left in a consistent state, and the copy operation may be resumed from the point of interruption. Furthermore, the number of objects that may be copied is not constrained by the amount of memory available in the system.

19 Claims, 12 Drawing Sheets

(56) References Cited

U.S. PATENT DOCUMENTS

| | | |
|---|---|---|
| 2001/0016807 A1* | 8/2001 | Hashima et al. ............... 703/22 |
| 2004/0107125 A1* | 6/2004 | Guheen et al. .................. 705/7 |
| 2004/0133588 A1* | 7/2004 | Kiessig et al. ............... 707/102 |
| 2007/0088724 A1* | 4/2007 | Demiroski et al. ........... 707/100 |
| 2009/0240737 A1* | 9/2009 | Hardisty et al. ............. 707/200 |
| 2011/0307440 A1* | 12/2011 | Panchenko .................. 707/600 |

OTHER PUBLICATIONS

European Patent Office, *International Search Report and Written Opinion of the International Searching Authority*—International Application No. PCT/US2009/045910, dated Dec. 4, 2009 (9 pages).

\* cited by examiner

Copy Systems

Disciplines
Select the disciplines to be copied

- ⦿ All disciplines ——400
- ○ Restrict selection ——403
  - Equipment
  - Piping
  - HVAC
  - Electrical
  - Structural
  - Hangers & Supports
- ○ Restrict selection with custom filter ——406
  - [Text1]     [Select Filter]

[< Back] [Next >] [Cancel]

*FIG. 4*

| Copy Systems | | |
|---|---|---|
| Destination Systems Select the destinations for the copied systems. | | |

Destination plant:

| Tortilla | | Select Plant |

Parent systems: — 500  — 503

| Source System | Destination System |
|---|---|
| AreaSystem-1-0001 | AreaSystem-5-0103 |
| UnitSystem-1-0002 | UnitSystem-5-0104 |
| UnitSystem-1-0003 | UnitSystem-5-0105 |
| StructuralSystem-7-0147 | ... |
|  |  |
|  |  |
|  |  |
|  |  |
|  |  |

Default permission group:

| ▼ |

[ < Back ] [ Next > ] [ Cancel ]

*FIG. 5*

| Copy Systems |
|---|
| Transformations<br>Select the types of transformations to be applied to the copied objects. |

☑ Move

| From coordinate system: | To coordinate system: |
|---|---|
| CoordSys A1 [+++] | CoordSys X22 [+++] |

| East distance: | North distance: | Up distance: |
|---|---|---|
| 100 ft | 25 ft | 0 ft |

☐ Rotate

| Axis coordinate system: | Angle of rotation: |
|---|---|
| [+++] | [+++] |

☐ Mirror

| Plane coordinate system: | Mirror plane: |
|---|---|
| [+++] | [▼] |

[ < Back ] [ Next > ] [ Cancel ]

*FIG. 6*

Copy Systems

Results

The results of the operation are shown below.

Operation status: Completed
Total number of objects to be copied: 3574
Objects copied successfully: 3474
Objects failed to copy: 100

Results by class:

| Class | Copied | Failed |
|---|---|---|
| Equipment | 355 | 11 |
| PipeRun | 68 | 0 |
| PipeLine | 34 | 0 |
| Member System | 198 | 2 |
| Slab | 22 | 5 |
| Wall System | 49 | 4 |
| Piping System | 34 | 0 |
| Coordinate System | 76 | 0 |
| Duct | 98 | 7 |

[ Delete All Copied Objects ]   [ Close ]

```
<CopyClass Name=...>
    <TargetsInPredecessors>
        <Path>
            <Step  RelType=... Dir=...>
            <Step  RelType=... Dir=...>
                ⋮
        </Path>
        <Path>
            <Step ...>
            <Step ...>
        </Path>
    </TargetsInPredecessors>
    <TargetsInSelf>
        <Path>
            <Step ...>
            <Step ...>
        </Path>
        ⋮
    <TargetsInSelf>
</CopyClass>
```

- 1206: first `<Path>` block under TargetsInPredecessors
- 1210: second `<Path>` block under TargetsInPredecessors
- 1200: TargetsInPredecessors section
- 1203: TargetsInSelf section

FIG. 12

```
<?xml version="1.0" encoding="windows-1252" ?>
<!--
================================================
File name:
  SystemsCCD.xml
Description:
  Copy class definitions for System objects
================================================
-->
<XML>
  <CopyClasses>
    <CopyClass Name = "CPMSystem"ClassID = "{5008FB84-BDB3-11D1-88A5-08003600F843}">
      <TargetsInPredecessors>
        <!--The parent system is a predecessor for this system-->
        <Path>
          <Step StepType = "DirectedRel"RelName = "SystemHierarchy"
            RelType = "{A8CE36E7-A53F-4558-8DF9-F0BCE6583327}"
            Dir="Backward"/>
        </Path>
      </TargetsInPredecessors>
      <TargetsInSelf>
        <<!--The System itself may be a target-->
        <Path>
          <Step StepType="Null"/>
        </Path>
      </TargetsInSelf>
    </CopyClass>
  </CopyClasses>
</XML>
```

*FIG. 13*

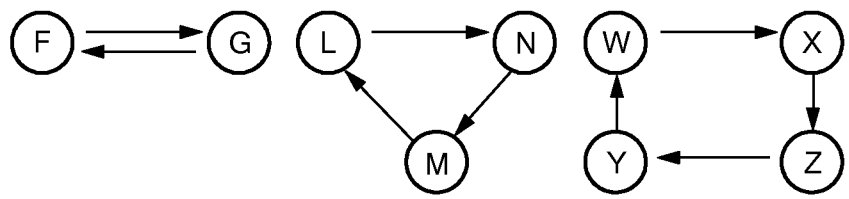

*FIG. 14*

METHOD AND APPARATUS FOR COPYING OBJECTS IN AN OBJECT-ORIENTED ENVIRONMENT USING A MULTIPLE-TRANSACTION TECHNIQUE

CROSS REFERENCE TO RELATED APPLICATIONS

This application claims the benefit of U.S. Provisional Patent Application No. 61/058,531, filed Jun. 3, 2008, titled "Method and Apparatus for Copying Objects in an Object-Oriented Environment Using a Multiple-Transaction Technique," the entire contents of which are hereby incorporated by reference herein, for all purposes.

TECHNICAL FIELD

The present invention relates to computer-aided design and computer-aided manufacturing (CAD/CAM) software systems and, more particularly, to methods and apparatus for copying large numbers of objects and relationships in databases used by such systems.

BACKGROUND ART

Enterprise engineering systems, sometimes also referred to as spatial information management (SIM) systems, are computer-aided design (CAD) systems that facilitate 2D and 3D modeling and visualization. These systems are used in the design, construction, operation and modification of industrial plants, such as oil refineries and power generating stations, as well as other large, complex structures, such as high-rise buildings, ships, and mining and other materials handling facilities. With their graphical user interfaces (GUIs), enterprise engineering systems enable designers to lay out structural, piping, electrical, heating, ventilating and air conditioning (HVAC) and other complex systems and to visualize all or selected portions of a project at various stages of construction or operation.

Most modern enterprise engineering systems utilize object-oriented paradigms, in which software constructs called "objects" represent real-world items, such as beams, walls, floors, pipes, valves, conduits, switches, fans, ducts and the like. Objects are typically implemented in software as data structures (ordered groups of data elements) that store information identifying the type of a real-world items represented, as well as information (such as length, width, color, capacity, etc., as appropriate for the item represented) about the specific item represented by each object.

Most objects are related to other objects. For example, if a pipe is to be attached to a beam, the object that represents the pipe is related to the corresponding beam object. Relationships are also typically represented by data structures. For example, the relationship between the pipe object and the beam object may include information that identifies the physical attachment of the pipe to the beam. Furthermore the relationship may include information indicating that the beam supports the pipe, and not the other way around.

Relationships between objects are ordered concepts. A relationship may indicate a logical order in which objects are added to a model. For example, when modeling a power plant building, a designer typically adds columns and places the columns at desired coordinates, and then the designer creates footings under the columns. The footing objects are related to the column object such that, for example, if a column is later moved or the weight it must bear changes, the enterprise engineering systems automatically moves the footing or automatically changes its size as required to bear the new weight.

In this example, the beam object and the footing object have a parent-child relationship. Here, the beam is referred to as a "parent" of the footing object, and the footing is referred to as a "child" of the beam object, because characteristics of the footing depend on characteristics of the beam. The characteristics of the footing, as well as characteristics of any other objects that are children of the beam, are automatically recalculated by the enterprise engineering system whenever a characteristic of the beam changes.

Many objects are made up of other objects. For example, a boiler may include a burner, a series of pipes and a pump for forcing fluid through the pipes. In this case, separate objects represent the boiler, the burner, the pipes and the pump, and relationships between the boiler object and the other objects indicate that the boiler includes or is made up of the other items and that the other items are parts of the boiler. Data structures that represent relationships between objects may include pointers or references to the corresponding object data structures.

Many modern enterprise engineering systems utilize relational databases (RDBs) or other database management systems (DBMSs) to store objects and relationships among the objects. In these systems, RDB records may be used to store the object and relationship data structures.

One particularly useful feature of enterprise engineering systems is the ability to copy one or more objects in a model, along with their corresponding relationships, and paste the copies into another portion of the model or into another model. For example, in a multistory office building model, objects and relationships representing plumbing of a given floor may be copied and pasted into other floors. A copy operation includes creating copies of the data structures that represent the objects and relationships being copied. A copy operation also adjusts values in the newly created data structures, such as to give the newly created objects unique identifiers and to establish relationships between the new objects and the portion of the model (such as the floor) where the objects are being pasted.

In order to maintain the validity of objects and relationships in a model's database, a copy operation should be "atomic." That is, either the entire copy operation should be completed without error, including storing ("committing") the newly created objects in the database, or none of the copy operation should be performed and no new objects should be stored in the database. If a non-atomic copy operation were to be abnormally terminated, such as by a system failure ("crash") or an attempt to copy a corrupt data structure, the copy operation would be only partially completed, and some parent objects or parent-child relationships might be missing from the resulting model, which would seriously undermine the value of the model. A database with missing objects or relationships is referred to as being "invalid" or "inconsistent."

Thus, to ensure atomicity, enterprise engineering systems perform copy operations in three steps. In the first step, all the data structures representing the objects and relationships that are to be copied are brought into memory and data structures representing all the newly created objects are created in memory. Then, in the second step, all the needed value adjustments in the newly created data structures are performed while the data structures are still in memory. The second step includes establishing all the relationships among the newly created objects and between the newly created objects and the existing objects. Then in the third step, the newly created data structures representing the new objects and relationships are committed to the database. Thus, the database reflects the model either before any of the copy operation has been performed or after the entire copy operation has been completed, but not at any intermediate stage. Atomic operations are also referred to as "transactions."

Many industrial plant models involve very large numbers of objects and relationships, which pose problems for enterprise engineering systems. Copying such a large number of objects and their relationships may exceed the memory capacities of these systems. As noted, a system's memory must be large enough to store all the data structures representing the objects and relationships that are to be copied, as well as the copies of these data structures. Even if a system has sufficient memory for a given copy operation, copying a large number of objects and relationships can take a significant amount of time, sometimes several hours. A long copy operation that abnormally terminates must be "rolled back" to undo the partial copy, and then the copy operation may be restarted from the beginning, all of which wastes valuable user and computer time.

SUMMARY OF THE INVENTION

An embodiment of the present invention provides a computerized method for copying a plurality of predecessor and successor objects represented within an object-oriented enterprise engineering system. In this system, each successor object has a predecessor relationship with a predecessor object. Input is accepted from a user selecting a plurality of objects to be copied. For each selected object, predecessor objects corresponding to the selected object are automatically identified. The selected objects and the identified predecessor objects are partitioned into a plurality of ordered groups of objects, such that for any given selected or predecessor object, its corresponding predecessor objects are in the same group as the given object or in a preceding group.

For each group in order, an atomic database transaction is performed. During the transaction, copy objects corresponding to the objects in the group are stored in the database. In addition, during the transaction, for at least one stored copy object corresponding to an object in the group, information is stored in the database to establish a predecessor relationship between the stored copy object and another object in the database. The other object does not correspond to any object in the group, and the stored copy object is a successor of the other object.

At least one predecessor relationship may exist between an object in one of the groups and another object in another of the groups. As part of the atomic database transaction for the one of the groups, information may be stored in the database to establish a predecessor relationship between the stored copy object corresponding to the object in the one of the groups and the copy object corresponding to the other object.

As part of identifying the predecessor objects, data may be received identifying a path starting at the selected object. The path extends through at least one object that is subordinate to the selected object. The path includes at least one step. Each step has a relationship type and a direction.

Identifying the predecessor objects may include receiving data identifying a first path and a second path. Each path starts at the selected object. Each path extends through at least one object that is subordinate to the selected object. Each path includes at least one step. Each step has a relationship type and a direction. The first path terminates at a target object that is not subordinate to the selected object, whereas the second path terminates at a target object that is subordinate to the selected object. Identifying the predecessor objects may include querying a database with a query formed from information from at least one of the paths.

Identifying the predecessor objects may include generating a computer-readable representation (such as a copy predecessor graph) of the selected objects. The representation is sorted, and the sorted representation is partitioned.

For each group in order, during the atomic database transaction, for each selected object in the group, subordinate objects may be automatically identified corresponding to the selected object. In addition, copy objects corresponding to the identified subordinate objects may be stored in the database.

For each group, as part of storing copy objects corresponding to the objects in the group, an object identifier of at least one of the copy objects may be stored in association with an object identifier of the corresponding object in the group.

Another embodiment of the present invention provides a system for copying a plurality of predecessor and successor objects represented within an object-oriented enterprise engineering system. In this system, each successor object has a predecessor relationship with a predecessor object. The system includes a user interface configured to accept input from a user selecting a plurality of objects to be copied. An identification module is configured, for each selected object, to automatically identify predecessor objects corresponding to the selected object. A partitioning module is configured to automatically partition the selected objects and the identified predecessor objects into a plurality of ordered groups of objects. For any given selected or predecessor object, its corresponding predecessor objects are in the same group as the given object or in a preceding group. A storing module is configured such that for each group in order, during an atomic database transaction, the storing module stores, in the database, copy objects corresponding to the objects in the group. In addition, for at least one stored copy object corresponding to an object in the group, the storing module stores information in the database to establish a predecessor relationship between the stored copy object and another object in the database. The other object does not correspond to any object in the group. The stored copy object is a successor of the other object.

At least one predecessor relationship may exist between an object in one of the groups and another object in another of the groups. The storing module may also be configured to, as part of the atomic database transaction for the one of the groups, store information in the database to establish a predecessor relationship between the stored copy object corresponding to the object in the one of the groups and the copy object corresponding to the other object.

The identification module may be further configured to receive data, such as a copy class descriptor file, identifying a path starting at the selected object. The path extends through at least one object that is subordinate to the selected object. The path includes at least one step, and each step has a relationship type and a direction.

The identification module may be further configured to receive data, such as the copy class descriptor file, identifying a first path and a second path. Each path starts at the selected object. Each path extends through at least one object that is subordinate to the selected object. Each path includes at least one step. Each step has a relationship type and a direction. The first path terminates at a target object that is not subordinate to the selected object, and the second path terminates at a target object that is subordinate to the selected object.

The identification module may be further configured to query a database with a query formed from information from at least one of the first and second paths.

The identification module may be further configured to generate a computer-readable representation (such as a copy predecessor graph) of the selected objects. In addition, the identification module may sort the representation of the selected objects and partition the sorted representation of the selected objects.

The storing module may be further configured, for each group in order, for each selected object in the group, during the atomic database transaction, to automatically identify subordinate objects corresponding to the selected object. The storing module may also store, in the database, copy objects corresponding to the identified subordinate objects.

The storing module may be further configured, for each group, to store an object identifier of at least one of the copy objects in association with an object identifier of the corresponding object in the group. For example, the storing module may construct a global copy map.

Yet another embodiment of the present invention provides a computer program product for use on a computer system for copying a plurality of predecessor and successor objects represented within an object-oriented enterprise engineering system. In the system, each successor object has a predecessor relationship with a predecessor object. The computer program product includes a computer-readable medium on which are stored computer instructions. When the instructions are executed by a processor, the instructions cause the processor to accept input from a user selecting a plurality of objects to be copied. In addition, for each selected object, predecessor objects corresponding to the selected object are automatically identified. Furthermore, the selected objects and the identified predecessor objects are automatically partition into a plurality of ordered groups of objects, such that for any given selected or predecessor object, its corresponding predecessor objects are in the same group as the given object or in a preceding group. For each group in order, during an atomic database transaction, copy objects corresponding to the objects in the group are stored in the database. In addition, for at least one stored copy object corresponding to an object in the group, information is stored in the database to establish a predecessor relationship between the stored copy object and another object in the database. The other object does not correspond to any object in the group. The stored copy object is a successor of the other object.

BRIEF DESCRIPTION OF THE DRAWINGS

The invention will be more fully understood by referring to the following Detailed Description of Specific Embodiments in conjunction with the Drawings, of which:

FIGS. 2-9 illustrate aspects of an exemplary user interface to an embodiment of the present invention;

FIG. 12 is a schematic illustration of a copy class descriptor file, according to an embodiment of the present invention;

FIG. 13 is more detailed schematic illustration of a copy class description file, according to an embodiment of the present invention;

FIG. 14 is a schematic diagram illustrating examples of looped relationships, according to embodiments of the present invention.

DETAILED DESCRIPTION OF SPECIFIC EMBODIMENTS

Figure 1:
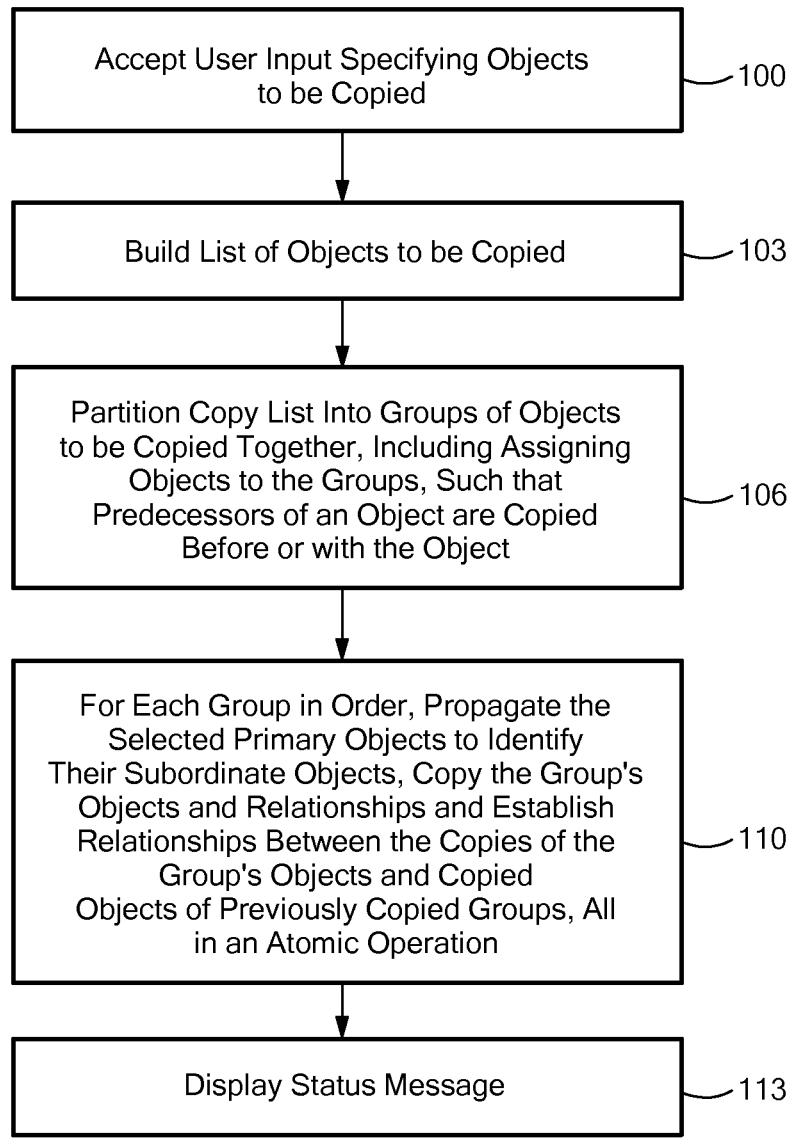
FIG. 1 is a flowchart illustrating operation of an embodiment of the present invention.
Figure 2:
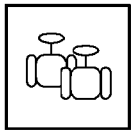

Methods and apparatus, according to the present invention, are disclosed for copying a large number of objects and relationships, while maintaining the integrity of a model database, but without the memory constraints of the prior art. A large copy operation is divided into a number of smaller atomic operations. Each small operation copies a subset of the objects and relationships into the model database. Thus, if a large copy operation abnormally terminates before all the small copy operations have been completed, the model database is, nevertheless, left in a consistent state, and the copy operation may be resumed from the point of interruption. Because each small copy operation copies only a relatively small amount of data, rolling back a failed or aborted small copy operation can be accomplished relatively quickly.

We recognized that the order in which objects are copied is important. If the objects were copied in an arbitrary order, and a large copy operation were abnormally terminated, the database would be left in an inconsistent state, because some newly created objects would not be connected by relationships to other objects, and parent objects might be missing from the database.

In accordance with our methods and apparatus, objects are partitioned into ordered sets of objects according to certain rules, and the sets are copied in order and such that each set of objects is copied as an atomic operation, which leaves the database consistent, even if the large copy operation abnormally terminates. If a large copy operation is abnormally terminated, the copy operation may be resumed at the point where it was terminated. Thus, user and computer time spent copying sets of objects up to the termination point is not wasted. Furthermore, a very large number of objects can be copied, without regard to the amount of available memory, by partitioning the objects into a sufficiently large number of sets, because only one set of objects and their copies need to be stored in memory at any time. Once the copies of each set are committed to the database, the memory may be reused.

A "successor" object is an object that must have a predecessor relationship to another object, called its "predecessor" object, and the predecessor object must exist for the successor object to exist. A beam object may be, for example, a predecessor to one or more objects that represent connection points on the beam. The connection point objects can not exist, absent a beam object. However, in some contexts, the beam object may exist without any connection point objects. Thus, a predecessor object is not required to have any successor objects.

Our rules state that predecessor objects that are to be copied should be copied no later than their respective successor objects. Thus, objects that are to be copied are organized into ordered groups, and the groups are copied in order, such that predecessors of a given object are copied into the database before, or in the same small operation as, the given object. Each small operation is atomic.

Embodiments of the present invention are described in the context of an enterprise engineering system. However, embodiments of the present invention may be used in other types of systems. As noted, enterprise engineering systems are computer-aided design (CAD) systems that facilitate 2D and 3D modeling and visualization of large, complex industrial plants. Such systems typically employ object-oriented paradigms and allow users to manipulate objects. Some objects are related to other objects, and the systems may automatically recalculate characteristics of related objects in response to user manipulations. For example, if a user moves a pump that is connected to a pipe run, a system may automatically change the length of the pipe run to accommodate the new pump location. Characteristics of a "recalculation successor" object, such as the pipe run in this example, depend on characteristics of a "recalculation predecessor" object, such as the pump. Copying objects within such a system involves creating copies of data structures that represent the objects and relationships being copied.

FIG. 1 contains a flowchart illustrating operation of one embodiment of the present invention. At 100, user inputs are accepted to specify a set of objects that are to be copied. The user interface may allow the user to select objects from a menu of choices or to enter or select filter criteria, which the system then uses to automatically select objects that satisfy the criteria. Alternatively, the user interface may provide a graphical selection tool, such as a selection cursor or a "rubber band" selection rectangle (or other shape), or any other suitable selection metaphor. Aspects of an exemplary "wizard" style user interface for prompting the user and for accepting the user's inputs and displaying information about a copy operation is illustrated in FIGS. 2-9.

Figure 3:
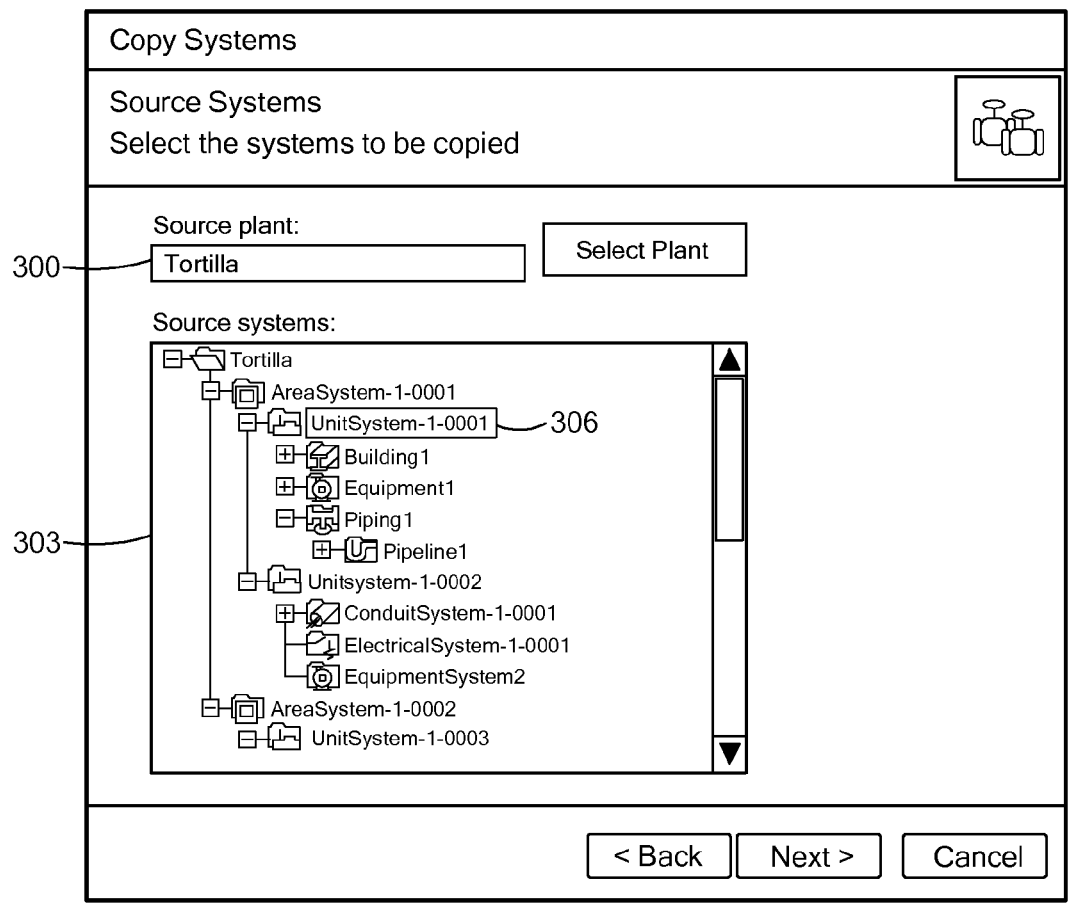

Using a dialog box shown in FIG. 3, the system may accept user inputs that select a portion of an existing model that is to be copied. As used in the exemplary dialog box, the term "plant" refers to a database. Thus, in the example shown in FIG. 3, the user has selected a "Source plant" 300 (i.e., a database) named "Tortilla." Each database stores information about a model in a hierarchy of "systems." Exemplary systems include structural systems (which may include objects such as footings, beams and columns), electrical systems (which may include conduit, wire runs, switches and the like), equipment systems (which may include pumps and tanks) and piping systems (which many include pipes, elbows, T-connections, valves and the like).

The granularity of the hierarchy depends on the particular enterprise engineering system being used and user requirements. The user interface displays levels of this hierarchy in a scroll box 303. In the example shown in FIG. 3, the user has selected to copy a portion of the hierarchy identified as "Unit-System-1-0001" 306, which includes the building, equipment and piping portions of the hierarchy.

An enterprise engineering system may include objects ("primary objects") that are exposed to a user through a user interface, as well as other objects ("subordinate objects") that are not exposed. For example, the system may expose primary structural objects, such as footings, columns and beams. The user may manipulate these primary objects through the user interface. For example, the user may move a column or specify its dimensions. The system may use the unexposed subordinate objects to store information about the exposed objects. For example, an I-beam primary object may be related to subordinate objects representing the beam's top flange, bottom flange and web, as well as subordinate objects that represent locations or ways in which other objects may be connected to the beam.

FIG. 4 illustrates a dialog box that accepts user inputs to select categories ("disciplines") of subordinate objects that are to be automatically included in the objects to be copied. The user may select all disciplines 400 or one or more user-specified disciplines 403, or the user may enter a custom filter 406 that provides selection criteria the system then uses to select subordinate objects.

FIG. 5 illustrates a dialog box that accepts user inputs to specify where copies of the copied objects are to be stored. The example shown in FIG. 5 assumes the user selected several source systems in the dialog box of FIG. 3. These source systems are listed under the heading "Source System" 500. The user interface may automatically propose names for the destination systems, as shown at 503, and the user may override or accept these names.

FIG. 6 illustrates a dialog box that accepts user inputs to specify transformations that are to be applied to the object copies. For example, the newly created objects may be moved 600 from the coordinates of the original objects. In the illustrated example, the newly created objects are located 100 ft. east and 25 ft. north of the original (copied) objects.

Figure 7:
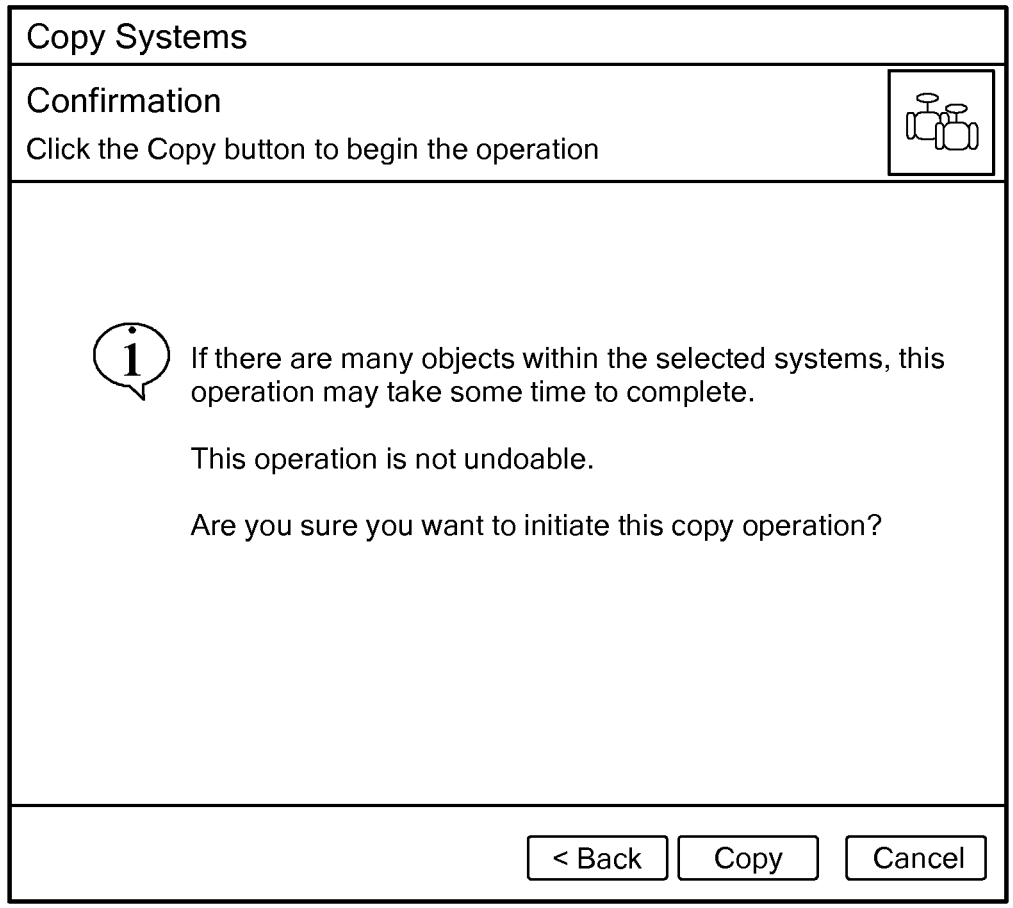
Figure 8:
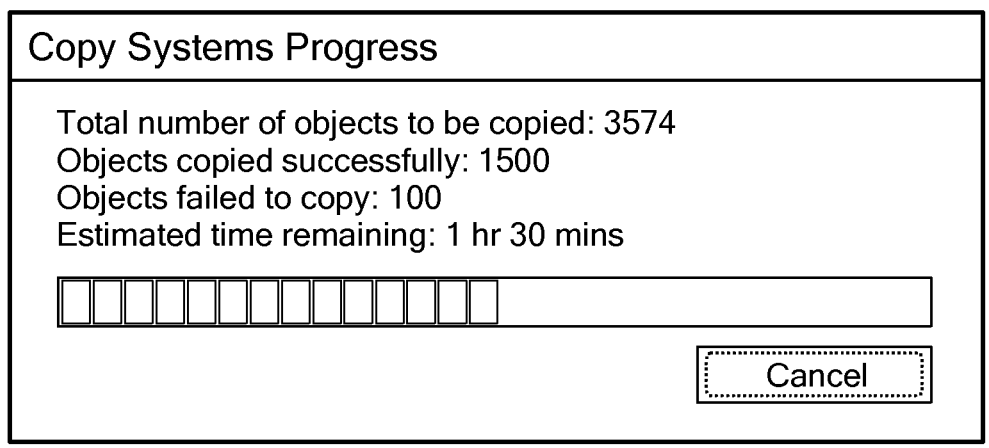

FIG. 7 illustrates a confirmation dialog box. Once the user initiates the copy operation, the system may display a progress indicator, an example of which is shown in FIG. 8.

Returning to FIG. 1, if an object is copied, the object's predecessor objects and the user-specified subordinate objects and their predecessors should also be copied. In support of this need, as indicated at 103, after the user has selected a set of objects that are to be copied, the system builds a list of the selected objects and automatically augments the list with other objects that should also be copied as a result of the specified objects being copied. The system automatically identifies predecessors of the selected objects and user-specified or automatically chosen subordinates of the selected objects. Because each predecessor or subordinate object may itself have predecessor or subordinate objects, this automatic identification may be performed by a recursive process. An exemplary method and associated data that may be used to identify predecessor objects is described in more detail below.

To conserve memory, the objects identified at 103 are not yet brought into memory. Instead, only object identifiers (OIDs) of the objects, which are much smaller than the objects themselves, are stored in memory. An OID is a number, string, database key or other quantity that uniquely identifies an object and that may be used to fetch an object from a database into memory (referred to as "binding" the object).

At 106, the list of objects that are to be copied is partitioned into a number of ordered groups of objects. The objects will be copied per group, and the groups will be copied in increasing order. The objects are assigned to the groups, and the groups are ordered, such that all predecessors of an object are members of the same group as the object or are members of a lower ordered group than the object. Thus, the predecessor objects will be copied with the object or earlier than the object.

As shown at 110, for each group in increasing order, the objects in the group, as well as subordinates of the objects in the group, are copied in the database in an atomic operation. This involves several intermediate operations. Data structures representing the objects whose OIDs are in the group, as well as data structures of subordinates of these objects, are bound into memory (i.e., read from the database). Copies of these data structures are generated in memory and stored in the database. Relationships among the in-memory data structures may be established while the data structures are still in memory or after the data structures are stored in the database, but before the group copy transaction is declared to be complete. Relationships are established between the data structures in the database that were created as part of the current group and data structures that were created as parts of lower ordered (i.e., earlier copied) groups. In addition, relationships are established between the data structures in the database that were created as part of the current group and data structures that represent other parts of the model. For example, if a piping system is copied from one floor of a building model to another floor of the model, some or all of the newly created objects may be made to relate to the object that represents the destination floor. Once all these intermediate operations have been completed, the atomic operation (i.e., the transaction) is declared to be complete.

Figure 9:
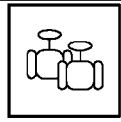

After all the group copy operations complete successfully, or if the large copy operation is abnormally terminated, a results dialog box may be displayed to the user to report status, as shown in FIG. 9.

Identifying Predecessor Objects

In one embodiment, predecessor objects are identified by constructing a directed graph (a "copy predecessor graph") that relates each primary object that is to be copied to its predecessors. The copy predecessor graph includes a node for each primary object that is to be copied. Edges of the graph represent relationships between the respective object nodes. A traversal of this graph yields an ordered list of primary objects to be copied. Sets of consecutive primary objects from this ordered list, as well as their subordinate objects, are assigned to successive groups, which are copied as described above. All the objects to be copied are thus partitioned into the groups. These operations will now be described in detail.

As noted, a primary object that is selected for copying often has related objects that should be copied along with the selected object. For example, a beam object may have several unexposed subordinate connection objects or other subordinate objects. In addition, the beam object may be connected to a predecessor column object, which is exposed to the user. The connection may be made through an unexposed subordinate connection point object related to the column object.

Figure 10:
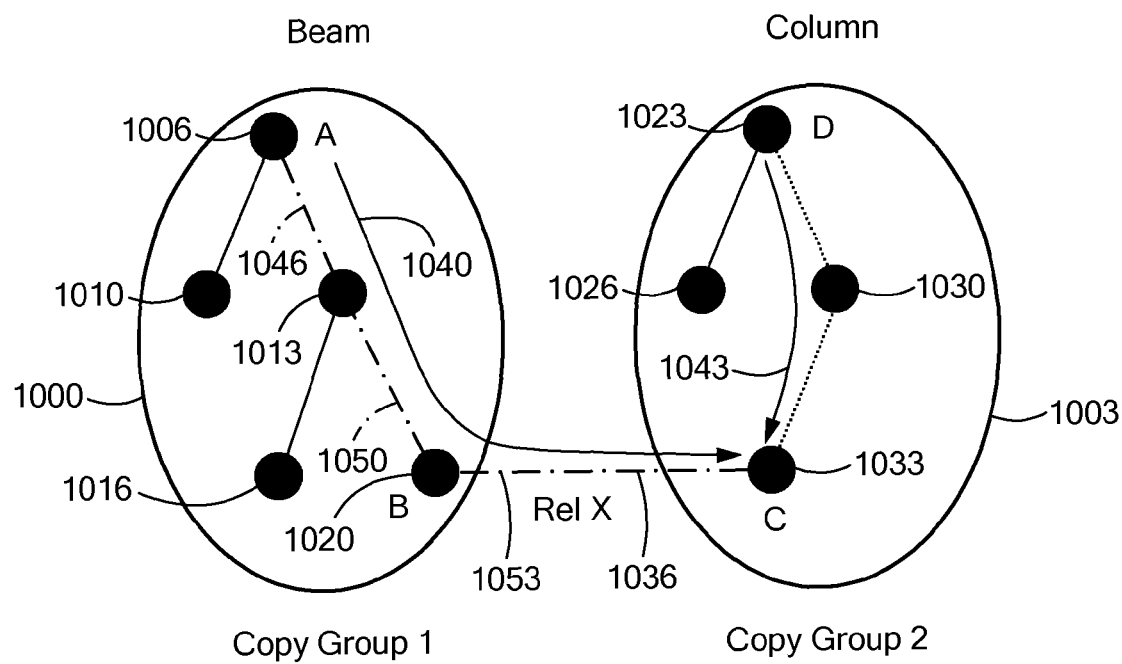
FIG. 10 is a schematic diagram of exemplary successor and predecessor objects, according to an embodiment of the present invention.

A graphical representation of such a situation is depicted in FIG. 10. Copy Group 1 1000 represents the beam object, and Copy Group 2 1003 represents the column. The primary beam object 1006 is related to a number of subordinate and/or exposed objects 1010, 1013, 1016 and 1020, all of which are predecessor objects and, thus, should be copied along with the exposed beam object 1006. Assume the object 1020 represents a connection point on the beam. Similarly, the primary column object 1023 is related to a number of subordinate and/or exposed objects 1026, 1030 and 1033. Assume the object 1033 represents a connection point on the column, and that a Relationship X 1036 represents the connection between the connection points 1020 and 1033 on the beam and the column, respectively.

The connection object 1033 in the column's copy group of objects 1023-1022 is referred to as a "target" object, because a relationship can be established from another object to the connection object 1033. If such a relationship were to be established, the column object 1023 would become a predecessor, and the other object would become a successor, for purposes of copying the objects. An object may have more than one target. In addition, relationships other than physical connections may be established. For example, an object may be related to a coordinate system object or to a unit of measurements object. Similarly, an object, such as a beam, may have more than one object through which the object may be related to another object.

An enterprise engineering system typically includes one or more software applications that manage the systems within a plant or a model. As noted, exemplary systems include structural systems, electrical systems, equipment systems and piping systems. These software applications create objects in response to user inputs, such as when a user adds a beam or a column to a model. In the object-oriented paradigm, a "class" is a definition or prototype of an object. Object-oriented systems have class definitions for each type of object that may be created.

In accordance with the present invention, each class definition provides information that enables software that copies objects of that class to traverse two types of paths, relative to the objects: (a) a path from the object, through the internal relationships of its copy group, to a target object in another object, with which the object could have a relationship and (b) a path from the object, through the internal relationships of its copy group, to a target within the copy group, i.e., to a target object through which a relationship may be established to this object.

The two types of paths are exemplified in FIG. 10. As noted, the beam may be connected to another object, and the beam's connection object 1020 is the object where the connection relationship 1036 would be established. As noted, other of the beam's objects 1010-1016 might also be objects through which relationships may be established. Because object 1020 can be used to establish a relationship with another object, path 1040 is an example of the first type of path, i.e., a path from the object 1006, through the internal relationships of its copy group, to a target object 1033 in another object copy group, with which the object 1006 could have a relationship 1036. Path 1043 exemplifies the second type of path, i.e., a path from an object 1023, through the internal relationships of its copy group, to a target 1033 within the copy group.

In some embodiments, each class definition provides a "copy class descriptor" file that includes information that a copy application may use to identify one or both of the two types of paths, depending on whether objects of the class can be targets or the objects can have relationships established to other objects. In some embodiments, this file is formatted according to the extensible markup language (XML) specification. A more detailed description of such an XML file appears below.

As noted, a typical enterprise engineering system stores information about objects and relationships in a relational database (RDB) or in another type of database. Some such systems maintain separate database tables for each type of object. For example, such a system may maintain a table for column objects and a separate table for beam objects. Information about relationships between objects may be maintained in the object tables or in separate tables. For example, a table of relationships, exemplified by Table 1, may record a pair of objects and a relationship between the objects in each row of the table. Thus, for each relationship between two objects in the system, the table contains one row. Table row fields may contain object identifiers (OIDs). The nomenclature "OID (B)" means the "object identifier of object B." The relationship shown in the second row of Table 1 corresponds to Relationship X 1036 shown in FIG. 10, indicating that the connection point B 1020 on the beam 1006 is welded to the connection point C 1033 on column D 1023.

TABLE 1

| Origin  | Destination | Relation Type      |
|---------|-------------|--------------------|
| OID (X) | OID (Y)     | Bolted connection  |
| OID (B) | OID (C)     | Welded connection  |

As indicated by the column headings ("Origin" and "Destination") in Table 1, relationships are directed. The direction of a relationship may, but need not, imply a successor/predecessor relationship between the two corresponding objects.

As noted, each class definition provides a copy class descriptor file containing information that enables software to traverse two types of paths, relative to the objects instantiated according to the class. FIG. 12 is a schematic illustration of an XML file for providing this information. Other suitable file formats may also be used.

For a given class of objects, the file contains two portions 1200 and 1203 that provide information about the two types of paths, respectively. The first portion 1200 ("TargetsInPredecessors") provides information about each possible path from the object, through the internal relationships of its copy group, to a target object in another object, with which the object could have a relationship, i.e., to an object that would be a predecessor of the object.

The example shown in FIG. 12 defines two such paths 1206 and 1210. Each path includes at least one "step." A step describes a relationship between two objects, including a description of the relationship type (RelType) and a direction of the relationship (Dir). Using the beam object of FIG. 10 as an example, the path 1040 would be described as having three steps, corresponding to the relationships 1046, 1050 and 1053. Starting at the object, any path that matches the number of specified step(s), the specified relationship type(s) (RelType) and the specified direction(s) (Dir), qualifies as a TargetsInPredecessors path.

Returning to FIG. 12, the second portion 1203 ("TargetsInSelf") of the XML file provides information about each possible path from the object, through the internal relationships of its copy group, to a target within the copy group. FIG. 13 is a more complete example of an XML copy class descriptor file.

When an object is selected by a user or automatically identified as an object to be copied, the system automatically identifies predecessors of the object. To identify the predecessors, the system identifies target objects in the predecessors, to which the selected object, or one of its subordinate objects, is related. To identify the target objects, the system builds a query for each TargetsInPredecessors path defined for the object class. The query contains a JOIN for each step of the path. The query is executed against the database. The query results in a table containing OID pairs. Each pair of OIDs includes an OID of an object to be copied, such as the beam 1006 (OID "A"), and an OID of a target object, such as the connection point 1003 (OID "C"). Table 2 illustrates a portion of an exemplary result of such a query.

TABLE 2

| OID of Object to be Copied | OID of Target Object |
|---|---|
| A | C |

The system also builds a query for each TargetsInSelf path defined for the object class. The query contains a JOIN for each step of the path. The query is executed against the database. The query produces a table containing pairs of OIDs. Each pair of OIDs includes an OID of a target object, such as the connection point 1033 (OID "C"), and an OID of the predecessor of the object selected object to be copied, such as the column object 1023 (OID "D"). Table 3 illustrates a portion of an exemplary result of such a query.

TABLE 3

| OID of Target Object | OID of Predecessor Object |
|---|---|
| C | D |

The above-described queries are executed for each class of object that is selected for copying, and the results of the queries are accumulated in the two resulting tables. The two tables are then joined on the table column named "OID of Target Object" to produces a third table. Table 4 illustrates a portion of an exemplary result of such a database JOIN operation. The rows of Table 4 represent predecessor relationships among the objects that are to be copied. For example, according to the first row of Table 4, object D (the column 1023) should be copied no later than object A (the beam 1006), because object D is a predecessor of object A.

TABLE 4

| OID of Object to be Copied | OID of Predecessor Object |
|---|---|
| A | D |

As noted, a copy predecessor graph includes a node for each primary object that is to be copied, and edges of the graph represent relationships between the respective object nodes. The system creates a node in this graph for each primary object selected by the user. In addition, the system adds a node to this graph for each primary predecessor object identified in the Table 3.

Figure 11:
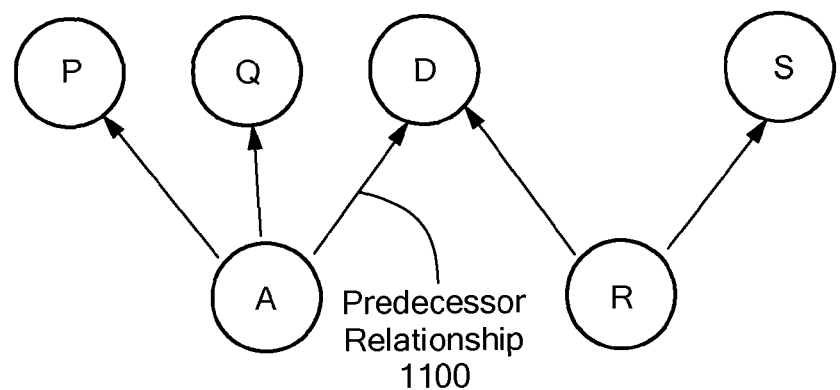
FIG. 11 is a schematic diagram of an exemplary copy predecessor graph, according to an embodiment of the present invention.

Each row of the joined table (Table 4) represents a predecessor relationship between an object that is to be copied and a predecessor object. The system adds an edge to the copy predecessor graph for each such predecessor relationship. FIG. 11 illustrates an exemplary copy predecessor graph. It should be noted that the predecessor relationship 1100 has been created for the purpose of determining a copy order. This relationship may exist solely in the copy predecessor graph. That is, the data structures representing objects in Copy Group 1 1000 and Copy Group 2 1003 (FIG. 10) may not store information about the predecessor relationship 1100.

Sorting Copy Objects

After the predecessor relationships have been added to the copy predecessor graph, the copy objects in the graph are sorted into a copy order, such that each object appears after all its predecessor objects appear. The copy order may be represented by a thread (such as forward and backward pointers) extending through the nodes of the copy predecessor graph, or by a separate copy order list, or by any other suitable indicator.

The copy predecessor graph may be sorted by any suitable method. Two exemplary methods will now be described. In a breadth-first sorting method, multiple passes may be made through the list of copy objects. During each pass, the copy objects, all of whose predecessor objects have already been added, may be added to the list. This sorting method tends to put unrelated objects near each other in the copy order list. Unrelated objects are, therefore, likely to be assigned to a given group of objects, which may lead to a larger number of cross-partition relationships.

It may be desirable to use a depth-first sorting method that puts related objects near each other in the copy order list. A single pass may be made over the copy predecessor graph to identify all copy objects that have no successor objects, i.e., to identify objects that are not predecessors to any other objects. For each object that has no successors, a recursive function may be called to add the object to the list. The function calls itself for each predecessor of the object, and then the function adds the object to the list. Thus, all the object's predecessors are added to the list before the object itself is added to the list.

Optionally, the objects may be presorted to group objects according to their physical location within a model. Objects, such as beams and columns, that are physically located near each other are more likely to be related than objects that are distant from each other in the facility that is being modeled. Thus, presorting the objects, so physically proximate objects are close together in the copy predecessor graph, may reduce the number of cross-partition relationships.

Two or more objects may be interrelated so as to form loops. Examples of such relationships are shown in FIG. 14. Loops may be detected during the sorting process. If a loop is detected, all the copy objects of a given loop are assigned to the same group of objects to be copied together.

Two copy objects, each of which considers the other object to be its predecessor, are referred to as "mutual predecessors." Mutual predecessor objects are assigned to the same copy group. Similarly, loops of mutual predecessor objects are assigned to the same copy group.

Once the copy objects in the copy predecessor graph are sorted, the copy objects may be assigned to successive groups, starting with the copy object at the beginning of the sorted copy predecessor graph and continuing in sort order to the end of the graph. "Copy propagation" is a process by which a selected set of primary objects that are to be copied are expanded to include all of their related subordinate objects. For each group, the primary objects, whose OIDs are in the copy predecessor graph, are bound to memory, and the primary objects are propagated to bind into memory the subordinate objects of the primary objects. The primary and subordinate objects can then be copied, and the copies can then be stored in the database.

The number of objects in each group may depend on whether a loop or mutual predecessor objects are found. In addition, subordinate objects should be included in the same group as their parent object. Otherwise, the number of objects in a group may be chosen based on one or more criteria. For example, smaller groups tend to increase robustness, in that if a small group copy operation fails, recovery involves a smaller amount of roll-back, etc. than if a larger copy operation fails. However, smaller group copy operations imply a larger number of such operations, which may negatively impact database performance. Groups may include as few as one object. All the copy groups need not contain equal numbers of objects. It has been found that a group size of one primary object, i.e., an object and all its subordinate objects, provides a good balance between robustness and performance. However, other group sizes may be used.

Reestablishing Relationships with Object Copies

Relationships among objects in a group of objects that are copied together are referred to as "internal relationships." Because all these objects are copied together, these relationships are copied along with the objects.

Relationships between objects in a group of objects that are to be copied together and objects that are not to be copied are referred to as "external relationships." If an external relationship is defined by the system as being required, after being copied, a relationship is established between the newly created object and a default target (defined by the system) or, if the user selected a new target object via the user interface (not shown), with the user-specified object. If an external relationship is defined by the system as being optional, the relationship need not be established with the newly created object.

Some relationships are likely to span partitions, i.e., to extend between objects in different groups of objects that are copied together. These relationships are referred to as "cross-partition" relationships. Because groups of objects are copied in order, by the time each object is copied, its predecessor objects will already have been copied or will be copied as part of the same group. In any case, by the time all the objects of a group have been copied, all the relevant predecessors will have been copied. Thus, relationships to the predecessors may be established during the atomic group copy operation.

To facilitate establishing relationships to objects that were created during previous group copy operations, the system maintains a "global copy map." The global copy map stores OIDs of objects that may be targets of relationships that should be reestablished as parts of subsequent group copy operations. Table 5 illustrates an exemplary global copy map.

TABLE 5

| OID of Object to be Copied | OID of Clone of Copied Object |
|---|---|
| C | C' |
| B | B' |

When an object (for example, object C 1033 in FIG. 10) that has a relationship to another object (for example, object B 1020) is copied, the OID of the object C, as well as the OID of the copy of the object (i.e., the newly created object, called a "clone"), are stored and correlated in the global copy map. Later, when the related object (object B 1020 in this example) is copied, the system detects the relationship between objects B and C. For example, the system may query the relationships table (see, for example, Table 1) to determine if object B has any relationships. Finding that object B has a relationship to object C, the system uses the OID of the clone of object C to establish a relationship between the clone of object C and the clone of object B.

The global copy map may be stored in memory. Alternatively, the global copy map may be stored on a secondary storage device, such as a disk, so the amount of memory does not constrain the size of the map. Of course, portions of the map may be cached in memory to improve performance, as is well know in the art.

Figure 15:
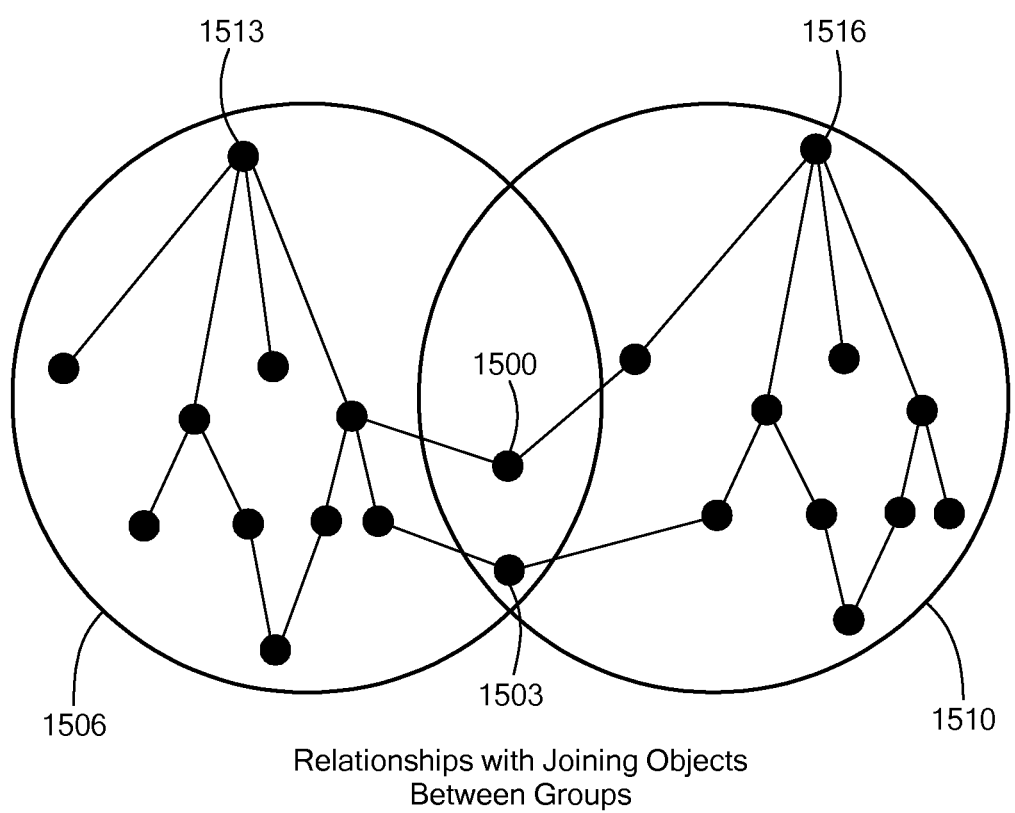
FIG. 15 is a schematic diagram of two joining objects, according to embodiments of the present invention.

Some relationships between objects are established through "joining" objects. FIG. 15 illustrates two such joining objects 1500 and 1503. If both groups 1506 and 1510 of objects that are related through the joining objects 1500 and 1503 are to be copied, but the two groups 1506 and 1510 are assigned to different groups of copy objects, i.e., in different partitions, flags are set to indicate that copy should be propagated from both sides of the joining objects. When the group containing object 1513 is copied, both the object 1513 and the joining objects 1500 and 1503 are cloned and the relationships to the clones are established. However, later in the process, each clone of the joining objects 1500 and 1503 detects that it does not currently join two objects and it is, therefore, deleted. The copy of object 1513 is committed without a joining object, and the object 1513 and its clone are added to the global copy map.

Later, when the group containing the other object 1516 is copied, both the object 1516 and the joining objects 1500 and 1503 are cloned. The clone of object 1513 is identified using the global copy map, as described above. Relationships between the clones of the joining objects 1500 and 1503 and the objects 1513 and 1516 are established. The resulting objects and relationships are then committed, as described above.

The above described methods many be performed by a computer system, including a processor, by executing appropriate instructions stored in a memory.

Methods and apparatus for copying a large number of objects have been described as including a processor controlled by instructions stored in a memory. The memory may be random access memory (RAM), read-only memory (ROM), flash memory or any other memory, or combination thereof, suitable for storing control software or other instructions and data. Some of the functions performed by the copy mechanism have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of the copy mechanism have been described with reference to a flowchart, those skilled in the art should readily appreciate that functions, operations, decisions, etc. of all or a portion of each block, or a combination of blocks, of the flowchart may be combined, separated into separate operations or performed in other orders. Moreover, while the embodiments are described in connection with various illustrative data structures, one skilled in the art will recognize that the system may be embodied using a variety of data structures. Furthermore, disclosed aspects, or portions of these aspects, may be combined in ways not listed above. Accordingly, the invention should not be viewed as being limited to the disclosed embodiment(s).

What is claimed is:

1. A computerized method for copying a plurality of objects represented within an object-oriented enterprise engineering system, the method comprising:
    performing by a processor,
    accepting input from a user selecting a plurality of objects to be copied, such that each of at least two objects of the plurality of objects to be copied is a successor object, wherein each successor object has a predecessor-successor relationship with a corresponding predecessor object, the predecessor-successor relationship being defined such that:
        each successor object includes at least one parameter having a value that functionally depends on a value of a parameter of its corresponding predecessor object, such that if the value of the predecessor object parameter changes to a changed value, the value of the successor object parameter must be recalculated based on the changed value of the parameter of the predecessor object using an engineering relationship; and
        the predecessor-successor relationship exists from prior to commencement of the method to after completion of the method;
    for each successor object of the plurality of objects to be copied, automatically identifying its predecessor object, thereby identifying a plurality of identified predecessor objects, wherein automatically identifying the predecessor object comprises:
        retrieving, from a database, information about relationships between the successor object and other objects; and
        following a logical path within the retrieved information, the logical path extending between the successor object and the predecessor object;
    automatically partitioning the plurality of objects to be copied and the plurality of identified predecessor objects into a plurality of ordered groups of objects, such that for each object of the plurality of objects to be copied and the plurality of identified predecessor objects, its predecessor object is in one of: the same group as the object and a group preceding the group containing the object;
    for each group in order, during an atomic database transaction:
        storing, in the database, copy objects corresponding to objects in the group; and
        for at least one stored copy object corresponding to an object in the group, establishing a predecessor-successor relationship between the stored copy object and another object in the database, wherein the other object does not correspond to any object in the group, and wherein the relationship is established such that the stored copy object is a successor of the other object.

2. A method according to claim 1, wherein at least one predecessor-successor relationship exists between an object in one of the groups and another object in another of the groups, the method further comprising:
    as part of the atomic database transaction for the one of the groups, storing information in the database to establish a predecessor-successor relationship between the stored copy object corresponding to the object in the one of the groups and the copy object corresponding to the other object.

3. A method according to claim 1, wherein automatically identifying the predecessor object comprises receiving data identifying a path starting at the successor object, the path extending through at least one object that is subordinate to the successor object, the path comprising at least one step, each step having a relationship type and a direction.

4. A method according to claim 1, wherein automatically identifying the predecessor object comprises receiving data identifying a first path and a second path, each path starting at the successor object, each path extending through at least one object that is subordinate to the successor object, each path comprising at least one step, each step having a relationship type and a direction, wherein the first path terminates at a target object that is not subordinate to the successor object and the second path terminates at a target object that is subordinate to the successor object.

5. A method according to claim 4, wherein automatically identifying the predecessor object further comprises querying a database with a query formed from information from at least one of the first and second paths.

6. A method according to claim 1, wherein identifying the plurality of identified predecessor objects comprises:
generating a computer-readable representation of the plurality of identified predecessor objects;
sorting the representation of the plurality of identified predecessor objects; and
partitioning the sorted representation of the plurality of identified predecessor objects.

7. A method according to claim 1, further comprising, for each group in order, during the atomic database transaction:
for each object of the plurality of objects to be copied, automatically identifying subordinate objects corresponding to the object; and
storing, in the database, copy objects corresponding to the identified subordinate objects.

8. A method according to claim 1, wherein, storing the copy objects comprises storing an object identifier of at least one of the copy objects in association with an object identifier of the corresponding object in the group.

9. A method according to claim 1, further comprising:
upon a copy object storing operation or a predecessor-successor relationship establishing operation abnormally terminating, determining a point of termination for the abnormally terminated operation; and resuming the copy object storing operation and the predecessor-successor relationship establishing operation at the point of termination.

10. A method according to claim 1, further comprises:
prior to storing at least one of the copy objects, storing, in the database, a copy object corresponding to a predecessor to the at least one of the copy objects.

11. A system for copying a plurality of objects represented within an object-oriented enterprise engineering system, the system comprising:
A processor configured to provide a user interface configured to accept input from a user selecting a plurality of objects to be copied, such that each of at least two objects of the plurality of objects to be copied is a successor object, wherein each successor object has a predecessor-successor relationship with a corresponding predecessor object, the predecessor-successor relationship being defined such that:
each successor object includes at least one parameter having a value that functionally depends on a value of a parameter of its corresponding predecessor object, such that if the value of the predecessor object parameter changes to a changed value, the value of the successor object parameter must be recalculated based on the changed value of the parameter of the predecessor object using an engineering relationship; and
the predecessor-successor relationship exists from prior to commencement of the copying of the plurality of objects to after completion of the copying of the plurality of objects;
an identification module configured, for each successor object of the plurality of objects to be copied, to automatically identify its predecessor object, thereby identifying a plurality of identified predecessor objects, the identification module being configured to:
retrieve, from a database, information about relationships between the successor object and other objects; and
follow a logical path within the retrieved information, the logical path extending between the successor object and the predecessor object;
a partitioning module configured to automatically partition the plurality of objects to be copied and the plurality of identified predecessor objects into a plurality of ordered groups of objects, such that for each object of the plurality of objects to be copied and the plurality of identified predecessor objects, its predecessor object is in one of: the same group as the object and a group preceding the group containing the object; and
a storing module configured such that for each group in order, during an atomic database transaction, the storing module:
stores, in the database, copy objects corresponding to objects in the group; and
for at least one stored copy object corresponding to an object in the group, stores information in the database to establish a predecessor-successor relationship between the stored copy object and another object in the database, the other object not corresponding to any object in the group, such that the stored copy object is a successor of the other object.

12. A system for copying a plurality of predecessor and successor objects according to claim 11, wherein:
at least one predecessor-successor relationship exists between an object in one of the groups and another object in another of the groups; and
the storing module is further configured to, as part of the atomic database transaction for the one of the groups, store information in the database to establish a predecessor-successor relationship between the stored copy object corresponding to the object in the one of the groups and the copy object corresponding to the other object.

13. A system for copying a plurality of predecessor and successor objects according to claim 11, wherein the identification module is further configured to receive data identifying a path starting at the successor object, the path extending through at least one object that is subordinate to the successor object, the path comprising at least one step, each step having a relationship type and a direction.

14. A system for copying a plurality of predecessor and successor objects according to claim 11, wherein the identification module is further configured to receive data identifying a first path and a second path, each path starting at the successor object, each path extending through at least one object that is subordinate to the successor object, each path comprising at least one step, each step having a relationship type and a direction, wherein the first path terminates at a target object that is not subordinate to the successor object, and the second path terminates at a target object that is subordinate to the successor object.

15. A system for copying a plurality of predecessor and successor objects according to claim 14, wherein the identification module is further configured to query a database with a query formed from information from at least one of the first and second paths.

16. A system for copying a plurality of predecessor and successor objects according to claim 11, wherein the identification module is further configured to:
generate a computer-readable representation of the plurality of identified predecessor objects;
sort the representation of the plurality of identified predecessor objects; and
partition the sorted representation of the plurality of identified predecessor objects.

17. A system for copying a plurality of predecessor and successor objects according to claim 11, wherein the storing module is further configured, for each group in order, during the atomic database transaction, to:
- for each object of the plurality of objects to be copied, automatically identify subordinate objects corresponding to the object; and
- store, in the database, copy objects corresponding to the identified subordinate objects.

18. A system for copying a plurality of predecessor and successor objects according to claim 11, wherein the storing module is further configured to store an object identifier of at least one of the copy objects in association with an object identifier of the corresponding object in the group.

19. A computer program product for use on a computer system for copying a plurality of objects represented within an object-oriented enterprise engineering system, the computer program product comprising:
- a computer-readable non-transitory medium on which are stored computer instructions such that, when executed by a processor, the instructions cause the processor to:
- accept input from a user selecting a plurality of objects to be copied, such that each of at least two objects of the plurality of objects to be copied is a successor object, wherein each successor object has a predecessor-successor relationship with a corresponding predecessor object, the predecessor-successor relationship being defined such that:
  - each successor object includes at least one parameter having a value that functionally depends on a value of a parameter of its corresponding predecessor object, such that if the value of the predecessor object parameter changes to a changed value, the value of the successor object parameter must be recalculated based on the changed value of the parameter of the predecessor object using an engineering relationship; and
  - the predecessor-successor relationship exists from prior to commencement of the copying of the plurality of objects to after completion of the copying of the plurality of objects;
- for each successor object of the plurality of objects to be copied, automatically identify its predecessor object, thereby identifying a plurality of identified predecessor objects, wherein automatically identifying the predecessor object comprises:
  - retrieving, from a database, information about relationships between the successor object and other objects; and
  - following a logical path within the retrieved information, the logical path extending between the successor object and the predecessor object;
- automatically partition the plurality of objects to be copied and the plurality of identified predecessor objects into a plurality of ordered groups of objects, such that for each object of the plurality of objects to be copied and the plurality of identified predecessor objects, its predecessor object is in one of: the same group as the object and a group preceding the group containing the object;
- for each group in order, during an atomic database transaction:
  - store, in the database, copy objects corresponding to objects in the group; and
  - for at least one stored copy object corresponding to an object in the group, establish a predecessor-successor relationship between the stored copy object and another object in the database, wherein the other object does not correspond to any object in the group, and wherein the relationship is established such that the stored copy object is a successor of the other object.

* * * * *